…

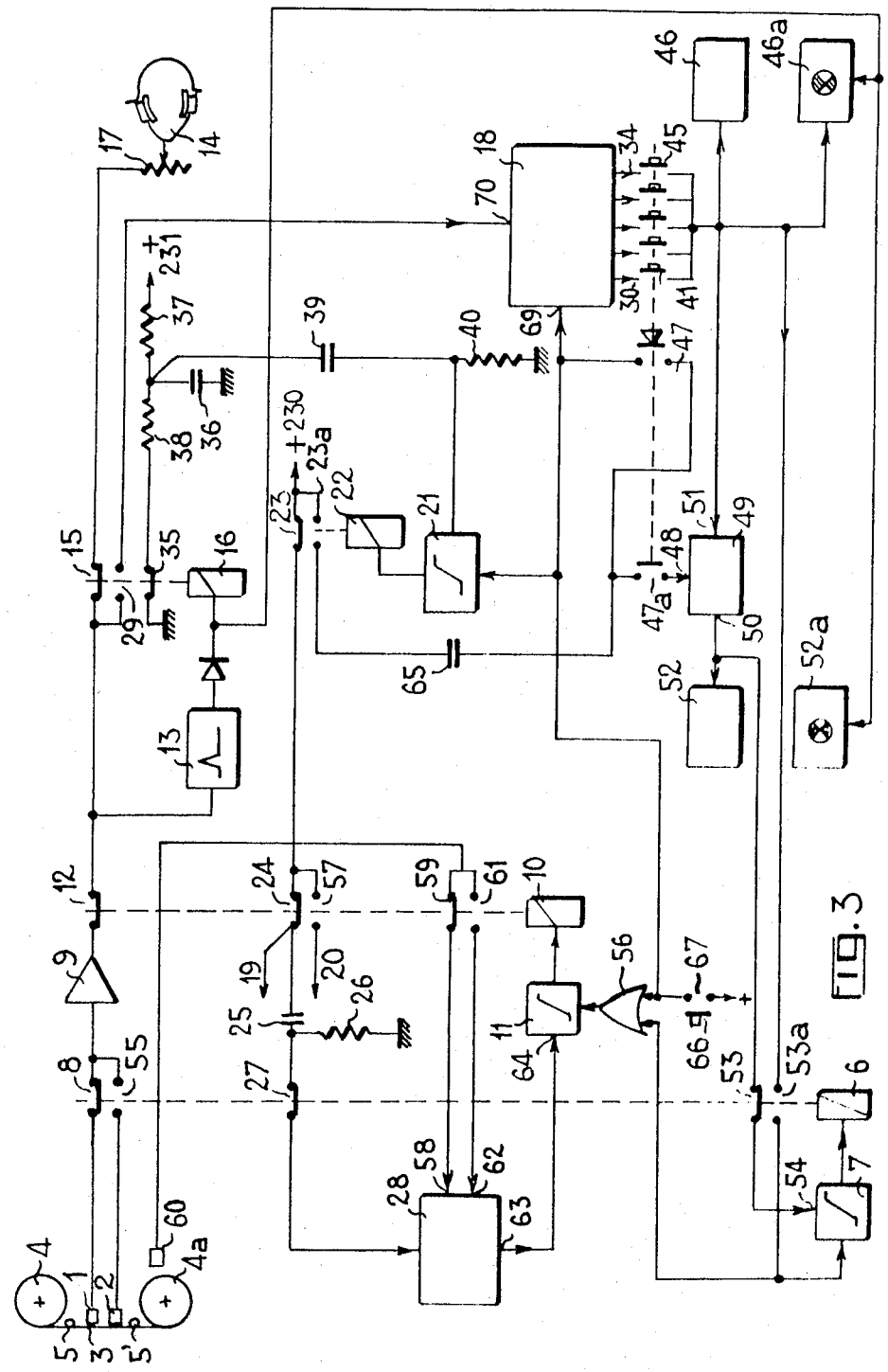

United States Patent Office 3,623,238
Patented Nov. 30, 1971

3,623,238
TEACHING MACHINE
Jacques Laplume, Gif-sur-Yvette, France, assignor to Societe d'Etudes Techniques et d'Enterprises Generales (SODETEG), Le Plessis-Robinson, France
Filed June 11, 1969, Ser. No. 832,290
Claims priority, application France, June 28, 1968, 157,048
Int. Cl. G09b 7/04
U.S. Cl. 35—9 A — 11 Claims

ABSTRACT OF THE DISCLOSURE

A tape recorder presents instructional items to a student, who has a keyboard; the student is asked to operate a particular key in response to a question at the end of each instruction item; if an incorrect answer is recorded by a key, a sub-instruction item including further explanation is presented to the student, the sub-instruction item being recorded on a parallel track, or in series with the main item, the sub-instruction items are skipped under control of a control unit if the key associated with the correct answer is operated. Machine instruction words to determine coincidence of key operation and correct answer are coded by pulse coded, selected frequencies recorded on the tape or the like, and selected by tank circuits.

---

The present invention relates to teaching machines, and more particularly to machines in which the student may engage in a dialogue with the instructor, as represented by the machine, so that the student can progress at his own rate of instruction. In particular, the machine of the present invention is provided with a series of increasingly detailed instruction items with respect to the subject matter to be taught, the particular detail of the instruction item being reproduced for the student's benefit in accordance with replies received from the student by way of a keyboard operation, indicating that the student has either understood an instruction item, or needs further explanation.

In traditional teaching, a dialogue ensues between students and teachers, enabling the teacher to gauge, by questions being raised by students, the progress made and the degree of understanding. The apparatus of the present invention is intended to provide the student with a machine capable of simulating such a dialogue.

Teaching machines have been proposed in which a computer is used in which instruction items are stored, and an instructional program is provided, the student controlling the flow of the program by giving either correct, or erroneous answers to questions at certain intervals. Such a solution is costly because of the cost of the computer, and requires a high degree of cooperation between the students and peripheral computer input devices. To teach foreign languages, for example, it has previously been proposed to record language courses on records, or magnetic tape, and to provide an opportunity for the students to record their answer and compare the answers by the students with recorded correct answers from the instructing tape. Entirely visual, or combined audio and visual equipment has also been proposed; in visual equipment, instruction items may be projected, for example by slides, on a screen. The student is then asked to press a certain key of a keyboard and, in accordance whether *the* answer is correct or incorrect, a next instruction item is projected or an explanation of the preceding instruction item is given if the answer was incorrect. Such apparatus is generally only individually useful, is rather complex and requires microfilming of programs and projection.

It is an object of the present invention to provide a teaching machine, which can be used both with visual, audio, or mixed audio-visual material, which is easily controlled and enables a dialogue between student and apparatus to take place.

Subject matter of the present invention.—Briefly, a movable storage means such as, for aural use, magnetic tape stores a number of instruction items for presentation to the student. An instruction item is presented to the student from the movable storage means (that is, magnetic tape) and the student records an answer by pressing a certain key on a keyboard, in accordance with a question posed at the end of the instruction item. The speed and movement of the movable storage means (tape) can be controlled by the key of the keyboard. The tape carries a code which is stored in a memory unit, and identifies the correct answer. The comparison between the stored code and the depressed key determines whether the answer is correct or incorrect. If the answer is correct, the tape then presents the next instruction item. If the answer was incorrect, as decoded in the comparator, an additional instruction item which can be recorded, in accordance with one feature of the invention in parallel, and in accordance with another feature, in series with the main instruction item is presented to the student. The type, whether series or parallel, will depend on the type of play-back equipment available. Such sub-instruction items can be supplemented by further sub-instruction items, recorded again in series, or parallel on the tape and the answer to the sub-instruction items being decoded each time, so that the student will receive progressively more detailed instruction and the student is enabled to obtain further information to reply to the questions posed by the original instruction item.

The invention will be described by way of example with reference to the accompanying drawings, wherein:

FIG. 3 is a schematic diagram of a parallel-type machine;

Figure 1:
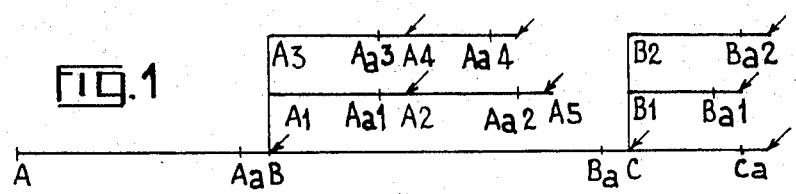
FIG. 1 is a schematic representation of parallel instruction programming.

The apparatus of the present invention will be described in particular in connection with a tape recording-type teaching machine, for aural presentation, although, of course, video tape, if necessary accompanied by sound, can also be used.

The instruction is cut into paragraphs or instructional items for presentation to the student, for example by loudspeaker or earphone; each instructional item, which may also be termed a paragraph, ends in a question to the student, in order to ensure that the instructional item has been understood and learned. In certain arrangements, the question may also appear as a printed text supplementing the aural instruction, which may also be supplied with visual information, such as illustrations, graphs, and the like. At the end of each paragraph, a code is recorded on the tape. This code is stored, and applied to a control unit which also includes a decoding element. This code is in the form of machine instructions, and to differentiate from the instructions to the student, will be referred to as a machine instruction code, and may, in accordance with known computer technology, comprise a plurality of machine instruction words formed of individual bits. The machine instruction code identifies correct, and incorrect answers among various possibilities which may be proposed to the students, to be answered at the end of the presentation of the instructional item. When the machine instruction code is sensed, further transport of the tape ceases; the student is thus given time to think and to respond to the questions raised by the instructional item. Storage of the machine instruction code itself can be triggered by a special "end of paragraph" (that is, instruction item) signal. In a preferred form, this signal may at the same time disconnect the earphones or loudspeaker, in order to avoid guesses on part of students who may learn to recognize aural code signals. The student is then asked to operate the keys of a keyboard, as requested by the question posed, for the correct answer. A coincidence, or comparator network compares the answer received from the student with the machine instruction code which was stored. In accordance with htis decoded instruction, further tape recorder operation will result and the memory is erased. Additionally, counters can be set to count correct, and incorrect answers. If the reply by the student is recognized to be correct, the tape recorder proceeds to present to the student the next instructional item paragraph which, again, will end in a question to be answered. The machine will thus respond to the student's reaction to the item taught, the keyboard acting merely as a device to translate the student's reaction into machine language.

If the reply of the student is incorrect, the tape recorder then presents to the student a text which may be termed "subparagraph," or "sub-instructional item." This text includes further explanation in order to elicit a proper and correct answer. Again, at the end of the sub-item, the student will be asked to reply to a new question, or, the previously posed question may be repeated. If the reply is again incorrect, a second sub-item, still more explicit, may be presented over the tape recorder, and so on, until a correct response is achieved. Again, at each time, a specific "end of sub-item" code is provided at the tape recorder sub-items following any sub-paragraphs.

If, after one or more sub-paragraphs have been presented, the student provides a correct answer, the next main item is presented. Each time, correct and incorrect answers are counted, for example in special counters which may apply a coefficient different from unity to incorrect answers, and to subtract a "score" from correct answers. The particular counter, or counter system, can be so arranged that a test score is indicated, for example by a read-out tube to the student so that he will know whether his answer was correct or not.

The present invention, basically, uses two systems—series and parallel. In the "parallel" system, sub-instructional items are recorded on parallel tracks on a magnetic tape together with the main instructional item; in the "series" type system, the sub-paragraphs (or sub-instructional items) are inserted as consecutive paragraphs on a single sound track. A third, hybrid variation may be used, in which sub-paragraphs are switched into a single track of instructional material, and special sub-paragraphs are located in tracks parallel to the sub-paragraphs to supply special information.

FIG. 1 illustrates, in schematic form, the "parallel" variations. Successive items occupy the lengths A–A$a$, B–B$a$, C–C$a$ . . . on track No. 1; the intervals A$a$–B, B$a$–C . . . are "end of paragraph" gaps, during which machine instruction code words are recorded, to be read by the decoding device and to be recorded in the memory of the system. The arrows indicate the points at which the tape stops, and during which the student is given time to ponder the questions posed.

Point B indicates a correct answer, which triggers reading of paragraph B–B$a$. If, however, a wrong answer is given, the reading device switches to another track; the drawing illustrates two additional tracks. After reading paragraph A1, A$a$1, the student is asked to reply at A2, and again two cases are possible as previously indicated. A still incorrect answer will trigger reading of sub-paragraphs A2, A$a$2. If, however, a correct answer was given at point A2, the equipment goes into a fast re-wind mode until point B is reached, and then proceeds to reproduce the first track, second instructional item B–B$a$. An incorrect answer at point A$a$2 would cause switching to track No. 3 and reading of sub-item A3, A$a$3.

At the end of the last sub-paragraph, point A$a$4, return to point B is automatic; alternatively, it may be triggered by a control to be used by the student, for example by a special key or key combination.

In accordance with a preferred feature, return to point B after reading of several sub-items can be obtained by counter control; after having read a certain length on track No. 1, for example upon arrival at point B from A, a counter is set to read zero. Regardless of which points A2, A4, or A5 the student eventually provides a correct answer, the tape is wound back until the counter again reads zero, at which point the tape is controlled for forward playback, and the proper playback head is connected into the circuit.

Figure 2:
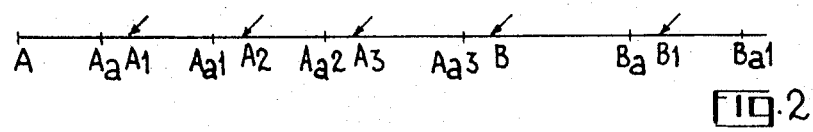
FIG. 2 is a similar representation of series instruction programming.

The "series" operation is schematically illustrated in FIG. 2. After reading of the first paragraph A–A$a$, the tape stops at point A1. If the answer is correct, the tape recorder goes into a fast forward mode up to point B, at which point normal playback speed is resumed in order to present instruction item B–B$a$ to the student. After the machine instruction code words have been read between the region A$a$1, A–1, the instructions are stored in the control unit so that, if the answer was correct, three "end of item" signals are to be skipped, namely A$a$1, A2; A$a$2, A3; and A$a$3, B, all at high speed; from point B on, normal playback speed is resumed. If the answer at A1 was incorrect, normal playback speed is retained by the tape in order to read sub-item A1, A$a$1. A correct answer at A2 again causes a fast forward jump of the tape to B. Under these conditions, only two fast "end of item" signals are detected by the reading heads. If the answer at A2 is, however, incorrect, the tape will present the next instructional item A2, and if still incorrect, A3.

Incorrect response at A1 may cause reading not only of sub-items A2, A$a$2, but may, for certain codes on the incorrect answer, demand a reading of the next sub-item A3, A$a$3. The machine instruction code words recorded at A1 will control such further playback, or accelerated speed at the end of paragraphs, or to jump a specific sub-item, all as desired by the programmer for the tape.

The "end of item" signals, both for the series or parallel type of recording, are preferably recorded on the magnetic tape as a signal of a characteristic frequency, within the band width of the magnetic tape, but at the extreme limit in order to prevent audible signals to the listener. For example, a frequency of 100 to 200 Hz. may be used, which frequencies may readily be filtered out at the amplifier to the reproducing loudspeaker or earphones of the student. The spectral density of the energy of the human voice at those frequencies is usually fairly low, and these frequencies can be eliminated during recording of the next, so that a selective filter is not spontaneously energized during voice recording. Such selective removal of frequencies from aural information does not substantially interfere with understanding of the human voice. A more elaborate filtering can be obtained by dynamic filtering; the output level from the filters is compared with a signal level of the remainder of the spectrum recorder on the tape. The difference between the overall level and the specific frequency level is amplified and, when the tape recorder senses the characteristic frequencies with absence of any text, a clear peak will be obtained. During ordinary reading of the next, the output from the filter will be small, whereas the spectrum of the remainder of the frequencies will be high; a simple comparator can then readily distinguish between a specific recording of a frequency, and a general voice level in which a particular frequency also occurs. Such selective, dynamic filtering systems are known, even if not previously used in connection with teaching machines, and the particular circuitry necessary is therefore not described in detail.

In the parallel type of recording, the "end of item" signal is passed by the reproducer heads at normal reproducing speed, and sensing by any reading head therefore does not offer any difficulty. In the series recording type system, however, the "end of item" signal must be read not only during normal playback speed of the tape, but also during high, fast forward speed. Reading of the end of paragraph signal thus presents some difficulties. Additionally, the tape has to pass over the reading head which may cause deterioration of both the reading head and the tape.

Let it be assumed that fast forward speed is ten times the normal playback speed. The characteristic frequency will thus also be ten times greater, for example be changed from 100 to 1000 Hz. Two selective filters are thus necessary, one responding to 100 Hz. and the other to 1000 Hz., the particular filter being switched in the circuit in accordance with the mode of operation of the tape recorder. This system, however, causes rapid wear on the reading head and deterioration of the tape. In accordance with a preferred feature, an auxiliary reading head is provided mounted in contact with the backside of the magnetic tape, that is the normally uncoated side. This reading head is utilized only to read the characteristic frequencies upon fast forward winding. The signal has to pass through the thickness of the tape, but due to the speed of winding, the rate of change of flux is increased. The "end of item" signal can, however, be recorded at such a high level, and since the tape head need recognize only presence or absence of a signal, a substantial margin of tolerance of signal level is available. The reading head is only in contact with a smooth, glossy surface of the tape, is not used up appreciably and furthermore the active surface of the tape is not degraded since it does not rub, at high speed, on a reading head.

The "end of item" signals may also be obtained optically; for example, a reflective or light-diffusing marker can be applied to the tape, or the tape may be perforated or in localized spots the magnetic substance may be removed to permit passage of light therethrough. Transmitted, reflected, or diffused light is then detected by a photo-electric cell which may, for example, be a photosensitive semi conductor. Optical reading of the "end of item" signal has the advantage that the tape does not need to be in contact with a reading head, and thus any wear thereon during high speed winding is avoided.

Other systems to recognize certain positions on the tape readily suggest themselves; the width, or transverse dimension of the tape may change, and mechanical sensors may be used to gauge the thickness, or width of the tape. Regardless of the method used, a pulse will be applied to the control unit of the teaching machine at the end of a paragraph, or item. Successive pulses are added in a counter, and a cumulative number can be compared with the numbers of the end of sub-paragraphs, which are to be jumped, in accordance with the instructions recorded in the memory of the decoding unit. Upon coincidence of numbers in the decoder and the number of "end of item" signals from the main items and sub-items, presentation of additional material to the student will be commanded by the instructions in the control unit. Of course, rather than counting up and down, or comparing numbers, counters can be set to provide output signals at particular numbers, for comparison with instructions stored in the control unit.

In accordance with a preferred embodiment of the invention, the instructions are recorded on the magnetic tape in the form of one or more frequency signals in the acoustic range, which are isolated and detected by selective filters, followed by threshold detectors and stored in memory elements. In the parallel type of instruction system (FIG. 1), the simplest arrangement provides for alternate responses, either correct or incorrect, all incorrect responses being treated in like manner. Only two magnetic tracks on the tape are necessary, namely a track No. 1 for main paragraph, and a track No. 2 for sub-paragraphs. Let $n$ be the maximum number of answers which are presented to the student, to choose therefrom, when the questions at the end of the items, or sub-items are presented, then each of the responses can be matched by operation of a key of the beyboard. For example, frequency $f1$ can be associated to key No. 1, frequency $f2$ to key No. 2, and so on. Let one suppose that number 2 is the correct answer; on the magnetic tape, then, the frequency $f2$ will be recorded, for example for one second, immediately after the "end of item" signal. A certain time gap should be left in order to permit switch-over of the reading amplifier and the decoders. The filter associated with frequency $f2$ will transmit a signal which is detected and will cause changeover of a storage element such as a core, associated therewith from state zero to state No. 1. The memory item may be a bi-stable flip-flop, a magnetic core, or any other element accomplishing these functions.

Operating any key causes read-out of the state of the corresponding memory element. If, for example; key 2 is operated, the state ONE is read, and the answer is interpreted as correct. Operation of any other key will result in a reading of ZERO, and an incorrect answer is noted. The resulting correct, or incorrect answer is then used in order to start the appropriate subsequent operations, as previously indicated, that is further operation of the tape recorder, with or without switch-over of the reading heads, or re-wind at high speed to the end of the previous paragraph, depending upon whether serial or parallel modes of operation are chosen.

The type of answer, correct or incorrect, may also be recorded in binary form, for example by the presence or absence of pulses of a frequency $f0$, or by the presence of either a frequency $f0$ or $f1$. A suitable code may be as follows:

| Decimal | Binary | Pulse sequence | | |
|---|---|---|---|---|
| 1 | 01 | $f0$ | | $F1$ |
| 2 | 10 | $F1$ | | $f0$ |
| 3 | 11 | $f1$ | | $f1$ |
| 4 | 100 | $f1$ | $f0$ | $f0$ |
| 5 | 101 | $f1$ | $f0$ | $f1$ |

Other codes may be used, for example a code in which weight 0 is assigned freqency $f0$, weight 1 to a frequency $f1$, a weight 2 to a frequency $f2$, as indicated below:

| Decimal | Weighted binary | Recorded frequencies |
|---|---|---|
| 1 | $2^0$ | $f0$. |
| 2 | $2^1$ | $f1$. |
| 3 | $2^1+1$ | $f1$ and $f0$. |
| 4 | $2^2$ | $f2$. |
| 5 | $2^2+1$ | $f2$ and $f0$. |

This code has the advantage that the various frequencies can be simultaneously recorded, rather than sequentially as before. Other codes may be used within the scope of the invention, more or less complex, and as desired by the programmer for the equipment.

Depending on the response of the student, as translated into machine language by the signal generated upon touch of a key of the keyboard, various operations will result, for example: choice of track to be read, speed, distance, and direction of winding of the tape, and the like.

In accordance with a preferred form of the invention, each key has a certain frequency assigned thereto, and defining the subsequent operations which are to result. For example, if one pulse at frequency $fp$ has been recorded on the tape, operation of key $p$ commands track No. 1 to be read. If two pulses at same frequency have been recorded, same operation may signify switch-over to track No. 2. Supplementary pulse sequences, or modification of the duration of pulses can then exactly set forth the extent, timing, and direction of spooling of the tape.

The signals associated with the various key elements can readily be decoded by known devices such as pulse counters, time duration discriminators, binary decoding devices and the like. Acoustic frequencies may be assigned to particular operations to be carried or to the particular key; or separate pulse sequences may be used. For example:

$f1$ may signify: switch to track No. 1
$f2$ may signify: switch to track No. 2
F may signify: switch to fast forward
$Fa$ may signify: spoolback to end of last paragraph and then switch to normal reproducing speed in a forward direction. The following code may be obtained by utilizing frequencies (a) and (b) simultaneously:

|     | 1 | 2 | 3 | 4 | 5 |
|-----|----|----|----|----|----|
| (a) | f3 | f2 | f1 | f2 | f1 |
| (b) | Fa | F  | F  | F  | Fa |

If the student touches key No. 1, the tape reproducer will be ordered first to spoolback at fast speed ($Fa$) and thereafter to playback at normal speed on track No. 3 ($f3$);

Key No. 2 (frequency couple $F$–$f2$): fast forward (F), then read track No. 2($f2$);

Key No. 3: fast forward (F), and then read track No. 1 ($f1$) * * * and the like.

The frequencies can readily be separated by filters. A stepping switch progressing step by step upon each pulse may feed successively the instructions into the particular memory associated with the particular key. The matching and triggering circuitry, which causes the commanded instruction to be executed, again, is within the skill of the art.

The "series" type of playback can readily be programmed in various ways, for example by generating pulses of a frequency, the number of pulses corresponding to the number of sub-items to be skipped upon fast forward reeling, in accordance with keys being depressed. In another embodiment, various different frequencies may be used, or a basic frequency may be modulated with another one; the various frequencies can be separated by filters, the information to be recorded and then simultaneously read in parallel. For example, the code $$f1,\ f1\text{–}f2\text{–}f3,\ f3,\ F3\text{–}f4,\ f4\text{–}F5$$

Figure 9:
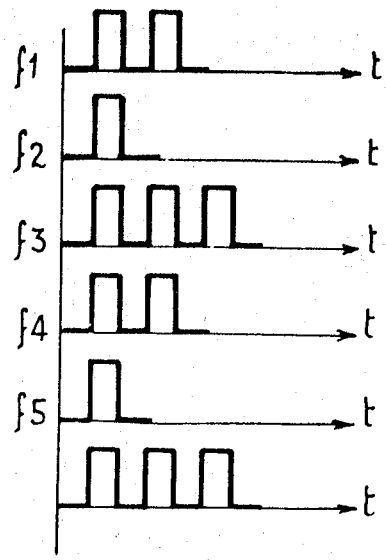
FIG. 9 is a representation of an instruction code.

(FIG. 9) illustrates:

operation of key No. 1: jump 2−1=1 end of sub-item
operation of key No. 2: jump 1−1=0 end of sub-item
operation of key No. 3: jump 3−1=2 end of sub-item
operation of key No. 4: jump 2−1=1 end of sub-item
operation of key No. 5: jump 1−1=0 end of sub-item The output of each filter is applied to a counter which counts, step by step, the number of pulses received. Operation of a key unlocks the tape recorder in fast forward mode and applies pulses from the pick-up heads of the tape recorder to the counter in reverse counting direction, to decrement the counter. When count 1 is reached, the tape recorder changes to normal speed mode, where it will remain if the counter state remains at count of ONE.

According to a modification, one unit of count may be subtracted at each operation of a key, and normal reproducing speed of the counter can be taken up again when it reaches a count of zero.

The number of correct answers can be identified by the length of pulse trains on a corresponding frequency. Each counter is re-set to zero after reading of instructions.

According to another mode of operation, the number of sub-paragraphs, or sub-items to be skipped may be defined by the duration of pulses which are specific to certain frequencies. Such specific pulses may also be replaced by two corresponding pulses, respectively located at the beginning, and at the end of the subparagraphs. The counters which respond to the "end of subparagraph" signals and which decode the specific frequencies assigned to the sub-paragraphs to be skipped may add the recurrent pulses emitted by a clock source during the time elapsed between beginning and end of paragraph pulses. The number of clock source pulses are stored, and the counter can be decremented, as previously indicated, upon playback of paragraphs, or the counter re-set if paragraphs are to be skipped.

Referring now to FIG. 3, wherein the "parallel" type of apparatus is shown: two reading heads 1 and 2 read the signals recorded on magnetic tape 3. The tape is wound on spools 4, 4a and guided over idlers 5, 5a. The two heads 1, 2, are illustrated side by side for clarity of representation, however, in actual practice, would be located on top of each other (with respect to the plane of the drawing) so that each may read a separate track on the tape. The apparatus is designed to operate with electromagnetic relays and flip-flops, and it is assumed that all flip-flops are re-set to the state zero and all relays are in deenergized condition at the time that the apparatus is first connected. Various re-set circuits, known by themselves in the art, are provided and not shown for clarity.

When contact 8 closes, head 1 is connected to amplifier 9, the output of which connects over switch 12 to a selecting filter 13, and additionally over closed contacts 15 of decoding relay 16 to a loudness control 17 and then to earphone 14. Selective filter 13 is designed for a characteristic frequency $f$, selected to indicate the end of paragraph, or sub-paragraphs. As previously indicated, frequency $f$ is chosen at an extreme end of the audio frequencies so that it can be readily isolated without disturbing voice recording.

Upon application of potential from a source 230, positive voltage will appear on the closed contact 23 and will be transmitted to contact 24 to control forward operation of the motor for the tape recorder over a line 19. The motor, and its specific control unit are not shown in the drawing, such elements being well known in the art. R-C combination 26, 25 is a differentiating circuit which applies a pulse over switch 27 to a counter 18 to re-set the counter. Counter 28 is connected with the tape reels to act as a tape winding counter. As the magnetic tape unwinds, the recording thereon is reproduced in earphones 14. At the end of an item, the signal frequency $f$ is detected in filter 13 which will energize relay coil 16. Normally closed (NC) contact 15 opens and disconnects earphones 14, and simultaneously normally open (NO) contacts 29 close to connect the output of amplifier 9 to the input 70 of decoding unit 18. Unit 18 decodes the identification signal which identifies the correct answer and provides a positive output voltage at one of the outputs 30 to 34. Additionally, the output from filter 13 resets the visual indicators 46a, 52a which respectively indicate correct and incorrect answers to zero.

NC contact 35 operated by relay coil 16 simultaneously opens with contact 15 and a charge from source 231 will build up on condenser 36 applied through resistance 37, resistance 38 being a current limiting resistance when the contact 35 is closed. Frequency $f$ appears as a pulse; as soon as the pulse ceases, relay coil 16 becomes de-energized, NO contact 35 closes, and condenser 36 discharges rapidly through resistance 38. A sharp pulse with a steep front will appear across the terminals of condenser 36. This pulse is applied by differentiator R-C circuit 40, 39 to a flip-flop 21, which will change state, engerizing relay coil 22 to cut supply to the motor of the tape recorder, causing the tape to stop.

The student is now ready to select an answer to the question at the end of the paragraph, or item. In order to convert his answer to machine language, he operates one of the key buttons 41–45, which are suitably interlocked to prevent simultaneous operation of more than one key button.

If the correct answer would correspond to key button 42, for example if decoding element 18 has a positive voltage at output line 31, and the student operates button 42, the output voltage on button 31 is applied to the "correct" counter 46 which will step by one unit, and indicate the correct answer in indicator 46a. Contact 47 closes with a slight delay upon operation of any one of the keys. Condenser 65 is connected across contact 23a, now closed, and the positive voltage is transmitted to the input to decoder 18 to re-set it to zero at terminal 69. Additionally, the flip-flop 21 is re-set. Relay 22 drops out and the tape recorder proceeds to operate. Contact 47a, which is operated together with any one of the keys of the keyboard, is arranged to operate slightly after any one of the keys 41, 45 have closed, but before contact 47 itself closes. Operation of contact 47a applies a voltage to the input 48 of logic circuit 49. Circuit 49 is arranged to transfer input pulses to output 50 provided that no inhibit voltage is present at terminal 51. In the example given, circuit 49 is blocked and does not provide output at its terminal 50.

Flip-flop 7 rests in state zero, and relay 6 is dropped out. Consequently, reading head 1 is again connected to the amplifier 9, and the operations just described will repeat until the end of the next paragraph.

If the student has answered by operating a wrong key, that is a key other than 42, no tension will appear on counter 46 and none to the input of circuit 49. Circuit 49 not being inhibited, a pulse will be applied to the output 50. This pulse is transmitted to counter 52, which steps by one unit and to the indicator 52a, controlled by a bi-stable flip-flop and not shown on the drawing, indicator 52a indicating an incorrect answer. Additionally a signal is transmitted over the closed contact 53 to input 54 of flip-flop 7. Flip-flop 7 will change state, as before, and re-set decoding element to zero and again unlock the tape recorder. This time, however, it is the reading head 2 which is connected to the amplifier across contact 55 which will be closed, since relay coil 6 will have been energized upon change of state of flip-flop 7.

Relay 6 has a small delay in closing, such that a voltage differentiated by R-C network 26, 25 is transmitted by contact 27 before it opens to re-set tape counter 28 to zero.

The second track of the magnetic tape 3, read by head 2, has additional explanations recorded thereon, in order to guide the student to the correct answer. These explanations form a subparagraph which is presented to the student, as before. At the end thereof, the student is again asked to answer to a question (which may be the same as the preceding one) and to translate his answer into machine language by operating one of the keys or switches 41–45. If the student still supplies a wrong answer, logic circuit 49 will operate as before. A pulse will appear on 50 which, however, is not transmitted to input 54 of flip-flop 7 since contact 53 is open. Relay 6 remains closed, and the tape recorder will start up again, continuing to read track 2. The correct answer is, however, recorded on counter 52.

The same sequence of operations, as before, will occur; a second sub-paragraph will supply further explanations to the student, explanations which are more detailed and explicit to guide the student to a proper answer.

If the student supplied a proper answer at the end of any one of the sub-paragraphs, a pulse will appear on 51 which will block the output at terminal 50 from circuit 49. The same pulse is applied over closed contact 53a, on the one hand in order to re-set flip-flop 7 to zero which changes state and causes relay 6 to drop out; and further, to the input 56 of flip-flop 11 which will likewise change state and energize relay 10.

Upon energization of relay 10, the magnetic tape is rewound by control over line 20, energized over contact 57 (relay 10). Additionally, contact 12 opens so that no signals are transmitted to phones 14 and none to filter 16 or to decoding unit 18. Re-wind is at high speed up to the preceding main paragraph item.

The correct point on the tape is found by counting; as the tape runs forward, count pulses are applied to input 58 of counter 28 across closed contact 59. These pulses, obtained from a head 60, which counts the number of revolutions of a rotary member in engagement with the tape (or fractions of revolutions) so that the length of the tape is measured. When relay 10 is energized, the pulses from reading head 60 are applied to the decrement input 62 of counter 28 across closed contact 61. When counter 28 reaches zero, a "zero" pulse will be obtained from output 63 which is transmitted to the re-set terminal 64 of flip-flop 11 thus causing opening of relay 10. The tape recorder will thus switch to the forward mode at normal reproducing speed.

The apparatus, thus, causes re-positioning of the tape each time to the end of the preceding main item before changing to the forward, reproducing mode.

Due to the inertia of the rotating parts, reversal of the direction of tape motion is not instantaneous, and the tape may re-spool a little beyond the end of a paragraph. In order to prevent this difficulty, counter 28 can be so arranged that it will provide an output pulse at terminal 63 not exactly when the counter reaches zero, but at a number which is selected in accordance with the mechanical and inertia characteristics of the tape recorder.

The student may supply a series of incorrect answers. At the first incorrect answer, following the end of an item, the tape recorder has switched to track 2. Subsequent incorrect answers cause tape recorder operation, still on track 2. The subsidiary explanations cannot, however, continue indefinitely. It is desirable that the length of the magnetic tape taken up by subsidiary explanations is not much more than the length of a main paragraph following the preceding one, on track 1; otherwise blank spaces may remain on the main track and a certain portion of track length is wasted. Thus, at the end of the last sub-paragraph, all codes will be recorded as indicating a correct answer, so that the decoding element 18 will change state. Under this condition, regardless of which key the student will operate, the tape will reverse to the end of the preceding paragraph, the reading head will switch, and the track 1 will be presented to the student. Still, it is desirable, that an incorrect answer after the last paragraph not be recorded as a correct one on counter 46. In order to prevent such a recording, an inhibit circuit is interposed in counter 46, and controlled by simultaneous change of state of all flip-flops in decoding unit 18. Such a circuit is not shown in the drawings. One may, however, as previously indicated, automatically unlock the return spooling of the magnetic tape at the end of the last sub-paragraph by a certain and specially assigned frequency for the re-wind operation, and record it on the tape.

Interruption of presentation of the tape may at any time be carried out by cutting the power. A re-play button 66 is provided in order to obtain repetition of the recording of the preceding paragraph. Closing of contact 67 re-sets flip-flop 21 and, consequently, drops relay 22, re-sets decoder 18 to zero, and changes state of flip-flop 11, thus causing re-wind of the reel without, however, change of the reading head.

Figure 4:
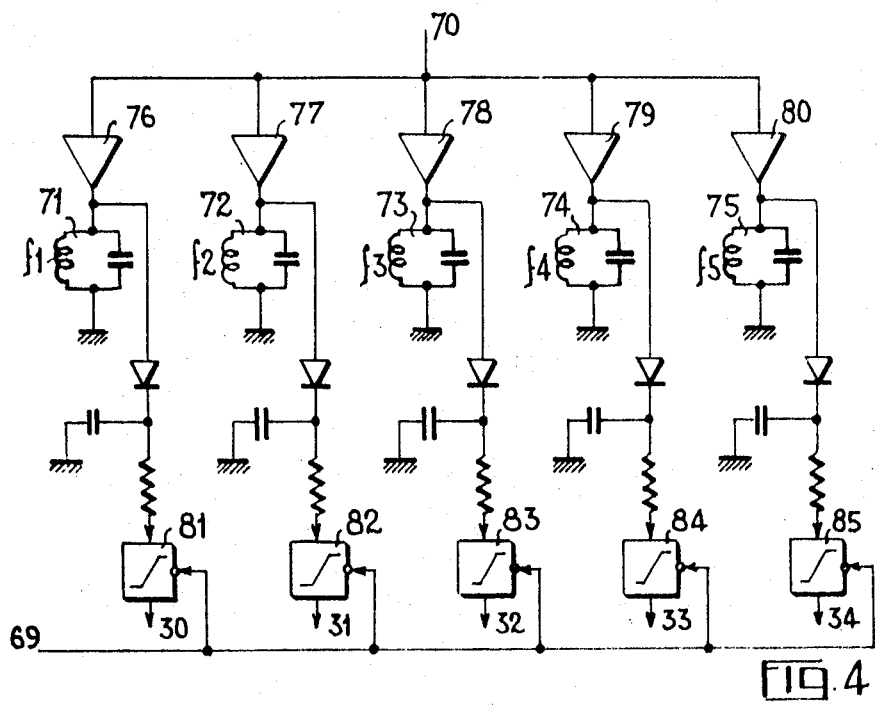
FIG. 4 is a schematic diagram of a decoder for FIG. 3.

Decoding unit 18 is illustrated in greater detail in FIG. 4. Five resonant circuits 71, 72, 73, 74, 75 are tuned to frequencies $f1$ to $f5$. The tank circuits 71 to 75 are isolated from input line 70 by means of input buffer amplifiers 76 to 80; if no amplification is necessary, simple de-coupling resistances may be used. The output across the tank circuits 71 to 75 is rectified and filtered by means of well known circuits including a diode and resistance-capacitance networks. If the frequency of the one to which the tank circuit is tuned appears at the input, the voltage will appear at the output to be applied to bistable circuits 81–85, to change the state of the flip-flops 81–85. A one output will appear at terminals 30, 31, 32, 33, 34, respectively. Flip-flops 81 to 85 are re-set by a pulse from line 69, whereupon the output at lines 30 to 34 will change from a ONE, for example a positive voltage to zero.

Any other kind of decoding unit may be used, the one in FIG. 4 being illustrated since it supplies a simple and inexpensive solution.

Circuit 49 (FIG. 3) may, in a simple form, include a transistor T1 (FIG. 5) of pnp type, connected to the three lines 50, 51 and 48 as indicated. In the absence of a positive voltage on line 51, a positive voltage on line 48 will render the transistor conductive and a positive output will appear on line 50. A sufficiently high positive voltage on line 51, however, causes the transistor to block and the output at line 50 will remain at ground potential.

Figures 5, 6, 7:
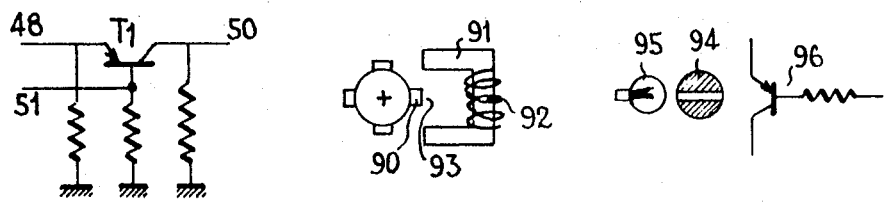
FIG. 5 is a schematic diagram of a program sequence control.
FIG. 6 is a representation of a reading system.
FIG. 7 is a representation of a preferred embodiment of a reading element.

The passage of magnetic tape in front of reading heads 1, 2 is preferably counted by means of a pulse counter; FIG. 6 illustrated a wheel, in rotating engagement with the tape (for example by being connected to an idler pulley 5) having four magnetic teeth 90 which pass by legs 91 of a U-shaped core on which a coil 92 is wound. In the position shown in FIG. 6, magnet 90 will be opposite the space between the legs of the core, and the magnetic flux will be a minimum. Passage of the teeth 90 close to the ends of the legs will change the flux in the core, thus providing a pulse sequence as the teeth 90 rotate in front of the magnetic core. Other structures providing a pulse output as the tape passes before the reading heads may be used; alternatively, core 91 may be magnetized, for example by a separate magnetization coil or a D-C component passed through winding 92 and the teeth 90 on the rotating element may be of high permeability material. Magnetic sensing of passage of tape is simple, but has the disadvantage that the intensity of the pulses changes with speed and, that at low speed the output is weak so that threshold amplifiers must be used. The arrangement in accordance with FIG. 7 provides an output which is independent of speed of the tape. A light source 95 directs a beam of light through a rotating element 94 which has a hole therethrough, the beam impinging on a light sensitive surface of a photo transistor 96 when element 94 is in the position shown in FIG. 7. A pulse output signal will be obtained from transistor 96 which pulses, due to the amplification characteristics of the transistors themselves do not require further separate amplification. Outputs in the order of one volt may readily be obtained, particularly if avalanche-type photo transistors are used. By suitable dimensioning of the hole through element 94, the amplitude of the pulses may be made practically independent of rotational speed within the ordinary speed ranges of tape recorders and the pulse duration will be affected only little.

Figure 8:
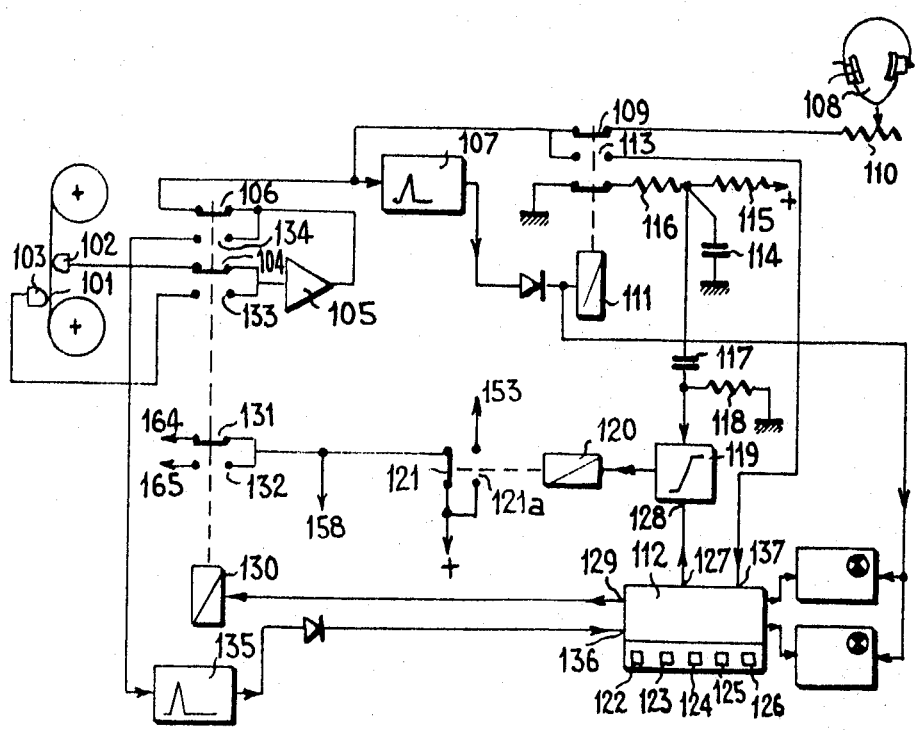
FIG. 8 is a schematic diagram of a series-type machine.

The embodiment of the system described in connection with FIG. 3 was of the "parallel" type. An example of the "series" type of apparatus is illustrated in FIG. 8. Magnetic tape 101 passes in front of a reading head 101 located at the side of the coating on tape 101; an auxiliary head 103 is arranged at the backside of the tape. The tape transport mechanism itself is so arranged that head 102 is in contact with the tape only when it is in normal record-reproduce mode, that is at relatively slow speed, in order to prevent rapid wear on the tape and on the head. Head 103, at the smooth and glossy backside of the tape may be in contact with the tape at all times.

The circuit is again arranged so that, upon energization, initially all flip-flop circuits are in the state ZERO, and all relays de-energized. Upon connecting the circuit, positive voltage is transmitted over contacts 121 and 131 to control normal reproducing speed of the tape recorder, by energizing line 164, connected as well known in the art. Signals from head 102 are connected over closed contact 104 to the input of amplifier 105 and then, after amplification, over closed contacts 106 to a junction where they are applied on the one hand to a selective filter 107 and on the other, over contacts 109 to a volume control 110 and earphones 108. As before, detection of a characteristic "end of item" frequency $f$ by head 102, as selected in filter 107, causes energization of relay 111. NC contact 109 will open and NO contact 113 will close. Earphones 108 are now disconnected and further signals from head 102 are connected over contacts 113 to input 137 of decoding unit 112.

The "end of item" signal is recorded for a period of approximately one second; when frequency $f$ terminates, relay 111 drops out. Condenser 114, which was previously charged over resistance 115 from a source of positive potential quickly discharges over resistance 116. The pulse thus obtained is differentiated in R-C network 118, 117 and flip-flop 119 changes state, causing relay coil 120 to be energized and NC relay contact 121 to open and NO contact 121a to close. Opening of contact 121 interrupts power to the tape recorder motor, which will stop.

The student now operates one of the keys of the keyboard (of which five only are shown by way of example); any one of five keys 122 to 126 is operated, and will apply a pulse at output 127, to be applied to re-set terminal 128 of flip-flop 119, causing de-energization of relay 120, closing of contact 121, and start-up of the tape recorder. The tape recorder will again operate, at normal speed only if no output appeared at terminal 129 of decoded unit 112. This will be the situation if any one of the keys which was operated indicated that the answer was incorrect, so that the next sub-item is to be read. If unit 112 has decoded the answer as the correct one, then an output will appear at terminal 129. Relay 130 will be energized, contact 131 will open and contact 132 close and power from contact 121 is now applied to line 165 which controls the tape recorder motor to go into the "fast forward" mode of operation.

Operation of relay 130 further causes contacts 133 and 134 to close. Reading head 103 is now connected across amplifier 105, and the output of amplifier 105 is connected to filter 135. Filter 135 is set to respond to a frequency which corresponds to the frequency $f$ when read at high, rewind speed of the tape; let $n$ be the ratio of speed for normal voice reproduction with respect to fast forward speed, the frequency of filter 135 will be set to $nf$.

At each end of sub-paragraph, a pulse will be applied from filter 135 to decoding unit 112. Decoding unit will have set therein the number of sub-paragraphs to be skipped, in view of the previously stored instructions and the answers selected by the student; when the number of pulses equals the number of sub-paragraphs to be skipped, power will be removed from terminal 129, relay 130 will drop and the tape recorder will revert to normal reproducing mode, with earphone 108 connected as before. Contact 106, previously open when relay 130 was energized, disconnects the earphone 108 so that no stray noises will be audible in the earphone.

Figure 10:
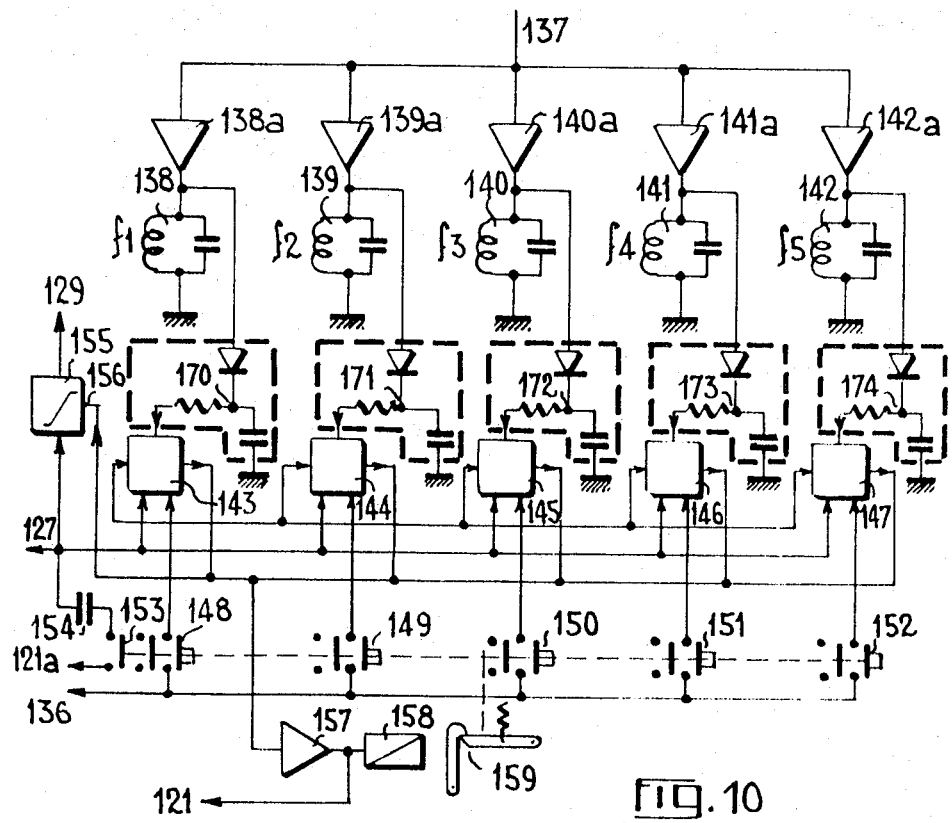
FIG. 10 is a schematic diagram of a decoding arrangement for the apparatus of FIG. 8.

Decoding unit 112 is illustrated in greater detail in FIG. 10. Various instruction codes may be used; for example, any particular possible answer may be associated with a specific predetermined frequency. These frequencies may be recorded simultaneously and their amplitude pulse modulated. The number of pulses may be equal to the number of sub-paragraphs to be skipped, incremented by one. For example, the following is recorded at the end of a paragraph (referring to the diagram of FIG. 9):

| Frequency: | Number of pulses |
|---|---|
| f1 | 2 |
| f2 | 1 |
| f3 | 3 |
| f4 | 2 |
| f5 | 1 |

This code may have the following significance:

Key selected:
 No. 1 skip 2—1=1 sub-item
 No. 2, skip 1—1=0 sub-item
 No. 3, skip 3—1=2 sub-item
 No. 4, skip 2—1=1 sub-item
 No. 5, skip 1—1=0 sub-item Decoding unit 112 has as many selection filters as possible choices offered to the student, in the example given five, and schematically shown by resonance circuits 138 to 142. Again, separating units 138a to 142a prevent interference between the tank circuits themselves. The output of each tank circuit is applied to a pulse counter 143 to 147 over a rectifier-filter circuit 170 to 174, respectively.

Figure 11:
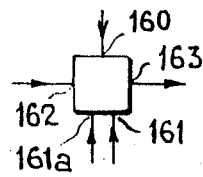
FIG. 11 is a diagram of a counter.

The convention adopted for the counters 143 to 147 is illustrated in detail in FIG. 11, where the lines have the following significance. Counter input: 160; independent decrementing inputs: 161 and 161a; reset to zero: 162; zero state output line: 163; a pulse will appear at line 163 when the counter passes zero.

In accordance with the above example, when the instructions are applied to input 137 of logic unit 112, counter 143 will count to 2, counter 144 will count 1, counter 145 will count 3 and counter 146 will be set to 2; counter 147 will have 1 set therein. Let it be supposed that the student operates key 150. A mechanical interlock, schematically indicated at 159 and constructed as well known in the art will prevent simultaneous operations of more than one key, and hold the operated key in position. Contact 153 is connected to be operated by all keys, so that a charge will be applied to condenser 154 over closed contact 121' of relay 120 (FIG. 8) and an output pulse obtained on line 127. As previously discussed, the output pulse sets flip-flop 119 back to zero, causing relay 120 to drop out and the tape recorder motor to start again. The same pulse is applied to decrement counters 143 to 147 by one. The counters will go back one unit and now will hold the number of sub-items to be skipped. Operation of key 150 connects line 136 to the decrement input of counter 145 (compare line diagram, FIG. 11) which will now have a state of 2. Each pulse from filter 135 applied over line 136 will now decrement the counter 145, step by step. When the second pulse has been transmitted, that is when two sub-items have been skipped on fast forward mode of operation of the tape recorder, counter 145 passes zero and will apply a "zero" state indicator pulse, which is connected to input 156 of flip-flop 155 to re-set the flip-flop to zero. As a result, relay 130 will drop out and the tape recorder will continue at normal, forward reproducing speed.

The pulses appearing at the output of counter 145 are simultaneously applied to the zero re-set terminal to all the counters, over a re-set connection, not shown and well known in the art. The memory of the decoding unit is thus cleared and ready to receive new instructions.

If the student had operated the second key, that is, button 149, counter 144 would have been enabled. This counter had the number 1 in storage and would pass through zero upon closing of contact 153. Flip-flop 155 will thus receive almost simultaneously a command to change state due to the charge on condenser 154, and to re-set to zero over input 156. Flip-flop 155 is so constructed that the zero re-set pulse overrides, that is will have priority regardless of the state of the flip-flop, so that any counter going to zero will re-set flip-flop 155. Under these conditions, even if the flip-flop quickly should change state, it will rapidly return to zero, and the short pulse appearing at output 129 is insufficient in order to energise relay 130. The return to zero in any counter is amplified in amplifier 157 which controls the relay coil 158, which unlocks the interlock 159 and the particular key which has been operated can return to normal and the system re-programmed. Relay 158 may additionally directly be controlled by a connection branched off from contact 121 (FIG. 8). By this way, when the tape recorder is operating, relay 158 is energized and locking of any key in position is prevented, since the interlock 159 becomes inoperative.

To prevent spurious operation of any one of the keys during operation of the tape recorder, the supply potential to contact 153 and condenser 154 is obtained over relay contact 121a of relay 120, open during normal operation.

The student must be advised whether his answer, as indicated by button operation, is correct or incorrect. In the series type of operation, it is sufficient if the student is informed that, upon a correct answer, the tape recorder will immediately present the next following main item, that is the next item which skips the largest number of sub-paragraphs. A simple comparator comparing the number of sub-paragraphs skipped with the number actually recorded can be connected to an indicator, to advise the student visually of the nature of his response.

Figure 12:
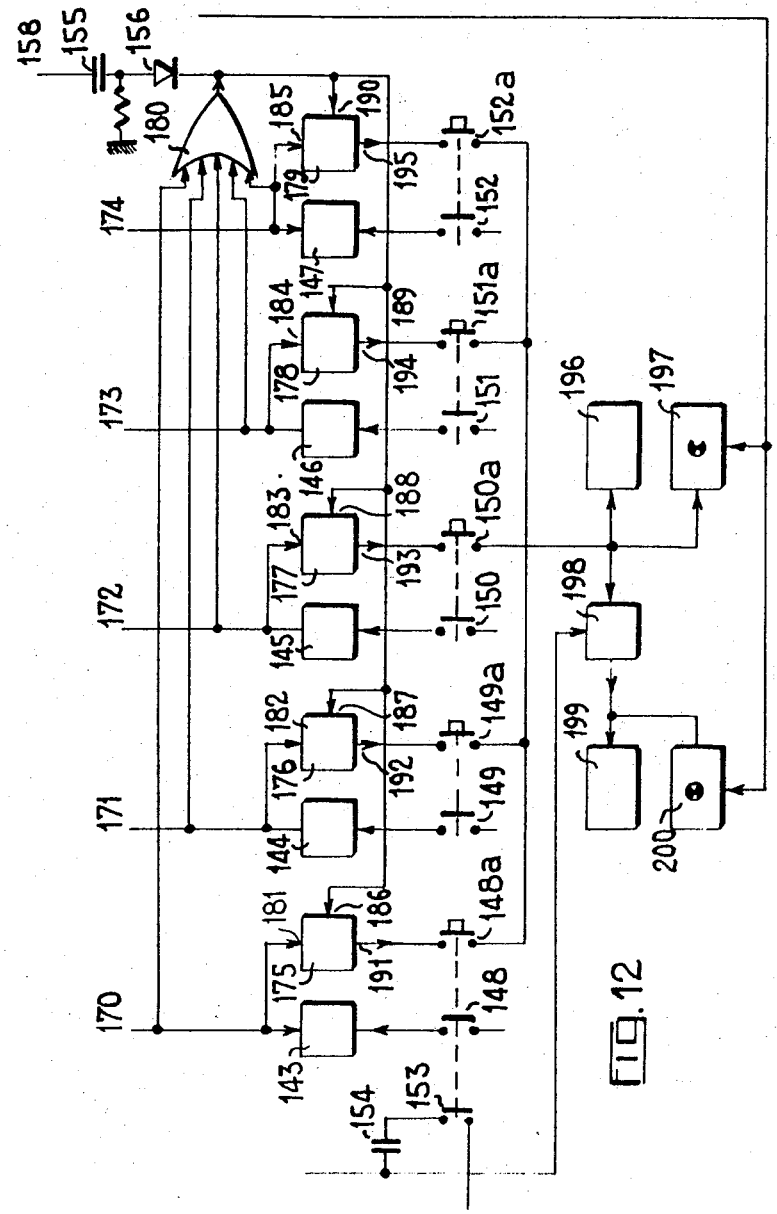
FIG. 12 is a comparator for use in the decoder of FIG. 10.

FIG. 12 illustrates another embodiment of a feature of the present invention, in which several elements previously discussed in connection with FIG. 10 are reproduced, in order to show the tie-in with the decoding unit. These elements have been given the same reference numerals.

The outputs from rectifier-filter circuits 170 to 147 are indicated as supply lines connected to the counters 143 to 147; additionally, mono-stable flip-flops 175 to 179 are provided, as well as an OR-circuit 180.

Flip-flops 175–179 are so constructed that a command to change to the state 1, applied at input lines 181 to 185 will have priority over the re-set pulse applied to inputs 186 to 190. In accordance with the decoding of the instructions, a train of pulses as illustrated in the last line of FIG. 9 will appear from the output of the OR-circuit 80. At the first pulse, all flip-flops 175 to 179 will change to state 1, since all inputs 181 to 185 are energized. In view of the construction of these units, the flip-flops will change to state 1 even if a re-set pulse to zero is applied simultaneously to inputs 186 to 190. Upon the second pulse, flip-flops 176 and 179 will change to state zero, inputs 182 and 185 not being energized, although inputs 187 and 189 are energized. At the third pulse, flip-flops 175 and 178 will return to zero, whereas flip-flop 177 receiving inputs over lines 183 and 188 will remain in the state of zero. At the end, a permanent voltage will remain only at the output 193 of flip-flop 177, the one which indicates the correct answer. If the student operates the third key, contact 150 will close and the previously described operations will start; briefly, the tape recorder will skip three sub-paragraphs in fast forward mode. Additionally, contact 150a will also close. The voltage on output terminal 193 is applied to a "correct" reply counter 196 which steps by one unit and further indicates in a visual storage and indicator element 197 that the answer was correct. Output voltage from terminal 193 is likewise applied to an inhibition circuit 198 which blocks and prevents output therefrom.

If the student had, however, operated any other button, counter 196 would not be energized, and circuit 198 would remain active rather than being blocked. Pulses from the charge on condenser 154 would be applied to circuit 198 which energizes a counter of incorrect answers 199 as well as a visual indicator and storage device 200 to indicate and record incorrect answers. Upon the subsequent stopping of the tape of the tape recorder, the signal from filter 107 ceases and the visual indications of answers are erased automatically since their input potentials drop to zero. The last flip-flop which remained in the state ONE, that is flip-flop 177, is re-set to zero upon start-up of the tape recorder by a re-set pulse applied over a condenser 155 and a diode 156 connected to contact 121, that is to the input of relay 158 (FIG. 10).

The actual constructions of circuitry of FIGS. 3, 8, 10 and 12 are given by way of example only and various other logic circuits may be used. Specific circuit elements have been described which are suitable, but other circuit elements having similar functions within the mode of operation of the invention may likewise be used. All electro-mechanical relays may, of course, be replaced by other change-over switches, such as multiple semiconductors, logical elements, and the like. The various filters and separation stages may be passive networks, or selective amplifiers, in which selectivity is obtained by a feed-back circuit of limited band width. Likewise, the resonance circuits shown as simple tank circuits may be replaced by complex filter networks and, if low frequencies are used, even by mechanical resonance elements. For certain applications it may be desired to include wave shaping networks, or buffer elements in the inputs and outputs of the various circuit components in order to ensure proper operations.

The present invention has been illustrated in connection with an audio type tape recorder teaching machine; video tape, and combined audible representation coupled to strip or motion film projection may be used, and various changes and modifications may be made within the scope of the inventive concept.

I claim:

1. Learning machine in combination with a movable magnetic tape storage means having instructional items stored thereon on a track for aural presentation to the student and having a student operated keyboard, the operation of individual keys of which records answers by the student in response to questions presented to the student by the instructional items, comprising transducer means reading the tape;
   means connected to the transducer means to aurally reproduce instruction items recorded on the tape;
   means controlled by said keys to supply a coded output indication in bit form representative of a particular key operated by the student;
   an end-of-item signal at a low audible frequency range recorded on the track of the instructional items as a separate recorded signal set spationally apart from the instructional items to provide a clearly identifiable single signal;
   filter means tuned to the frequency of said end-of-item signal and providing a switch-over control signal upon sensing said end-of-item signal;
   a plurality of coded machine instruction bits recorded with each item on said tape after said end-of-item signal to provide a machine instruction code;
   storage means connected to store the bits of said machine instruction code;
   switching means interrupting connection of the transducer means to the aural reproduction means and connecting the transducer means to said storage means;
   means to control movement and speed of movement of said tape;
   and means to compare the coded output indication representative of the particular key of said student operated keyboard which was operated, with said machine instruction code of said items, said comparing means comparing the bits of the machine instruction code and providing an output control signal depending on the match or mismatch of the bits of the output indication from said keyboard and the bits of the selected machine instruction code, said output control signal being connected to and controlling said speed and movement control means for said tape.

2. Machine according to claim 1, wherein said output control signal triggers said tape speed and movement control means in accordance with a selected instruction in said machine instruction code, as determined by the match decoded by said comparing means.

3. Machine according to claim 1, in which instruction items on said tape are grouped into main instruction items and sub-items, said sub-items being recorded on tracks on said tape parallel to the tracks of main instruction items; and wherein a plurality of sub-instruction items are serially recorded on a track parallel to the main instruction items, the beginning of the first sub-instruction item being at the same transverse location on the tape as the beginning of the next subsequent main instruction item on the track parallel thereto.

4. Machine according to claim 1, wherein said instruction items include main instruction items and sub-instruction items, sub-instruction items being recorded serially on the same track and subsequent to a main instruction item, whereby sub-instruction items will be switched in between main instruction items.

5. Machine according to claim 1, wherein:
   said transducer means includes a plurality of reading heads;
   a tape length counter is provide, interconnected with said comparing means;
   and said comparing means additionally is connected to and controls the energization of selected reading heads to read instructional items and sub-instructional items from said tape, said tape length counter controlling the speed of passage and reading of selected items on said tape in accordance with output control signals connected thereto from said comparing means.

6. Machine according to claim 1, wherein said machine instruction code is recorded, said code being formed by markings recorded on the tape as signals of predetermined frequencies, and said comparing means includes logic means controlled by said student operated keyboard.

7. Machine according to claim 1, wherein the bits of said machine instruction code includes a pulse series recorded at a predetermined frequency, the number of pulses corresponding to a number assigned to a key of the keyboard, whereby said number and frequency may indicate a single correct response by the student.

8. Machine according to claim 1 wherein said control means includes means recording the bits of the machine instruction code and being energized by the output control signal from said comparing means and erasure of the bits of the machine instruction code from said storage means upon presentation of a subsequent instruction item from the tape.

9. Machine according to claim 8 wherein said instruction items include a main instruction item and a group of sub-items, said control means, upon receiving an output control signal indicating non-coincidence of bits from an operated key and the bits of the machine instruction code, controlling the speed, movement, and reading of said tape to present a sub-item upon further operation of said tape.

10. Machine according to claim 1, including a tape length counter, said tape length counter comprising a rotatable element associated with the tape and driven thereby; said rotatable element being formed with a hole therethrough;
   and light generating and receiving means projecting a beam of light at said rotating element and receiving a light impulse upon coincidence of the opening in said rotating element with said source;

means counting the number of pulses as a measure of length of tape driving said rotatable element;

and means to trigger the tape backwards in accordance with the counted pulses as a measure of length of passed tape, so that the tape will again be in the same position as before the count.

11. Machine according to claim 1, including a tape length counter, said tape length counter comprising a rotatable element associated with the tape and driven thereby; means coupled with said rotatable element and providing output pulses representative of the length of tape rotating the rotatable element;

means counting the number of pulses as a measure of length of tape driving said rotatable element;

and means to trigger the tape backwards in accordance with the counted pulses as a measure of length of passed tape, so that the tape will again be in the same position as before the count.

References Cited

UNITED STATES PATENTS

| | | | |
|---|---|---|---|
| 3,194,895 | 7/1965 | Treadwell | 35—8 A X |
| 3,210,864 | 10/1965 | Tillotson III et al. | 35—9 R |
| 1,455,795 | 5/1923 | Logan | 235—103 X |
| 2,932,235 | 4/1960 | Ochiai | 179—100.2 S X |
| 3,141,243 | 7/1964 | Chapman et al. | 35—9 |
| 3,255,536 | 6/1966 | Livingston | 35—9 |
| 3,402,257 | 9/1968 | De Lange | 179—100.2 T X |
| 3,408,749 | 11/1968 | Brudner | 35—9 |
| 3,458,667 | 7/1969 | Burquez | 179—100.2 Z |

WILLIAM H. GRIEB, Primary Examiner